July 15, 1941.     J. W. TEKER     2,249,501

SHAFT SUPPORTING AND LUBRICATING ARRANGEMENT

Filed Oct. 17, 1940

Inventor:
John W. Teker,
by Harry E. Dunham
His Attorney.

Patented July 15, 1941

2,249,501

UNITED STATES PATENT OFFICE 2,249,501

SHAFT SUPPORTING AND LUBRICATING ARRANGEMENT

John W. Teker, Wesleyville, Pa., assignor to General Electric Company, a corporation of New York Application October 17, 1940, Serial No. 361,548

7 Claims. (Cl. 308—187)

My invention relates to supporting structures for rotatable shafts and to improved lubricating systems for such supports.

An object of my invention is to provide an improved supporting structure and lubricating arrangement for a rotatable shaft.

Another object of my invention is to provide an improved lubricating system for a rotatable shaft anti-friction bearing support.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
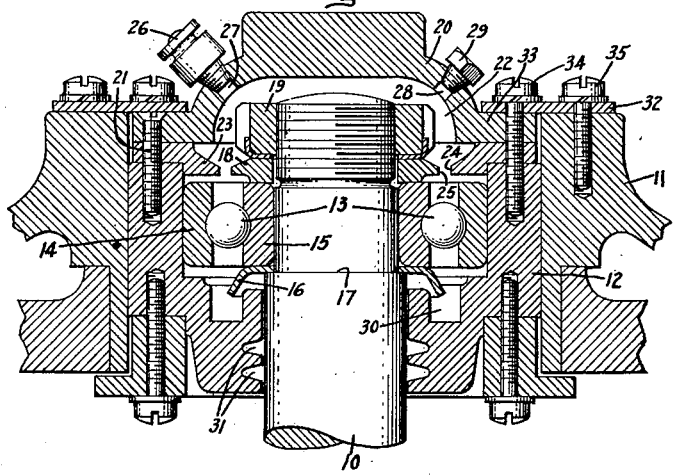
Figure 2:
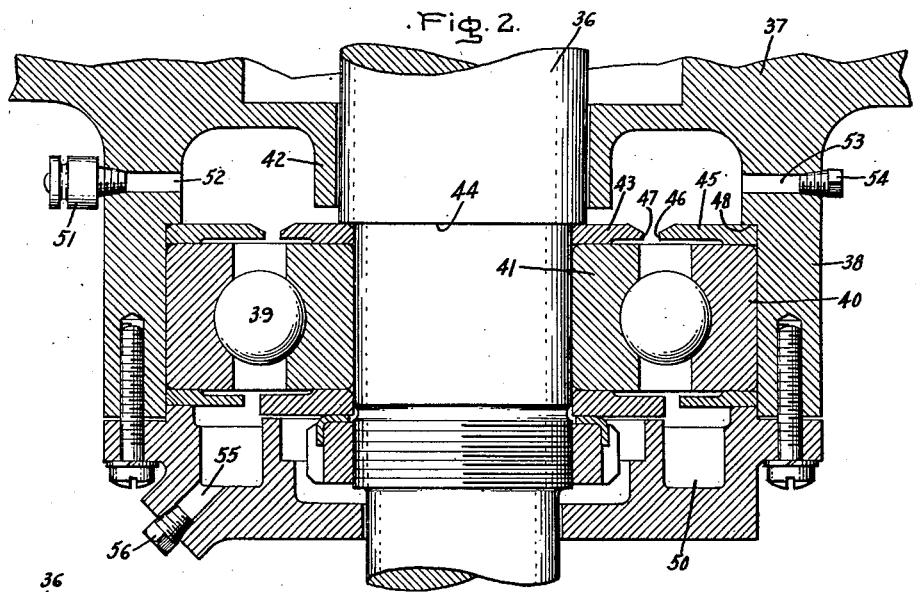

In the drawing, Fig. 1 is a sectional side elevational view of an embodiment of my invention as applied to the upper end of a vertical shaft; Fig. 2 is a side elevational view of another embodiment of my invention applied to a roller bearing support for a vertical shaft; and Fig. 3 is a partial side elevational view in section of a modification of the construction shown in Fig. 2.

Referring to the drawing, I have shown an embodiment of my invention in Fig. 1 applied to the upper end of a vertically extending shaft 10 which is supported in a frame 11 in which is arranged a bearing housing including a mounting ring 12 press fitted into an opening in the frame 11. I provide a support for the shaft in the frame by anti-friction ball bearings 13 having an outer race 14 fitted into an opening in the bearing housing mounting ring 12 and having an inner race 15 fitted onto the shaft 10. A slinger ring 16 is arranged below the bearing 13 to minimize the passage of lubricant along the shaft and is secured in position between the under side of the race 15 and a shoulder 17 formed on the shaft 10. The inner bearing race assembly is secured to the shaft 10 between the slinger ring 16 and an annular lubricant metering ring 18 by a shaft nut 19 which threadedly engages the upper end of the shaft 10. Considerable care must be exercised in lubricating anti-friction bearings not to feed an excessive amount of lubricant to the ball or roller bearings, as the bearings may be damaged by overheating as well if they are supplied with too much lubricant as if they are insufficiently lubricated. The problem of proper lubrication of such bearings is aggravated when the shaft supported by the bearings extends vertically, and provision for a definite supply of lubricant in such cases is very desirable. I provide an arrangement for supplying the desired amount of lubricant to the bearings 13 by providing a restricted passage through which lubricant is fed to the bearings from a lubricant reservoir. In Fig. 1, this reservoir is formed in the bearing housing and includes an end cap 20 rigidly secured to the mounting ring 12 by a plurality of screws 21 and constructed to form a closure about the end of the shaft 10 to exclude foreign particles from the bearing housing and to provide a space 22 adapted to be utilized as a lubricant reservoir. An annular restricted lubricant feeding passage is formed by a second annular lubricant metering ring element 23 arranged with its inner edge 24 spaced from and closely adjacent the outer edge 25 of the metering ring 18 and secured in position on the mounted ring 12 between the reservoir 22 and the bearing by the screws 21. A lubricant fitting 26 is secured in a supply opening 27 formed in one side of the bearing cap 13 for supplying lubricant to the bearing lubricant reservoir 22. When filling the reservoir 22 through the lubricant fitting 26, it is desirable that the attendant should know when the reservoir 22 is substantially filled in order to prevent forcing grease through the restricted passage between the reservoir 22 and the bearing 13. In order to provide such an indication, a vent opening 28 is formed in the bearing housing cap 20 on the side thereof opposite the supply opening 27. This vent opening 28 is adapted to be closed by a screw cap 29 which is removed when supplying lubricant to the reservoir, so that when the reservoir is filled lubricating grease will flow out of the vent opening 28 and give the attendant an indication thereof. During normal operation, the grease in the reservoir 22 will slowly flow downwardly through the restricted passage between the edges 24 and 25 of the metering rings 23 and 18, respectively, to the ball bearings 13. As this grease passes from the ball bearings 13, the slinger ring 16 will throw the grease away from the shaft 10 by centrifugal force into a collecting chamber 30. In order further to insure against the passage of lubricant along the shaft 10, a plurality of labyrinth sealing grooves 31 is formed in the bearing housing mounting ring 12 below the chamber 30. A locking ring 32 is arranged over a flange 33 of the bearing housing end cap 20 and is secured thereto by bolts 34 and secured to the supporting frame 11 by bolts 35.

In Fig. 2, I have shown another embodiment of my invention arranged to support a vertically extending shaft 36 within a supporting frame 37 provided with a downwardly extending flange 38 which forms the side walls of a bearing housing. The shaft 36 is supported within the frame 37 by anti-friction ball bearings 39 provided with an outer bearing race 40 fitted in the bearing housing flange 38 and an inner bearing race 41 fitted on the shaft 36. The frame 37 also is provided with an annular flange 42 extending about a portion of the shaft 36, so as to provide a chamber above the bearings 39 adapted to be used as a grease lubricant reservoir. As in the construction shown in Fig. 1, an annular lubricant metering ring 43 is arranged between the inner race 41 and the lubricant reservoir and is clamped between the upper side of this race and a shoulder 44 formed on the shaft 36. A complementary sealing ring element 45 is arranged with its inner edge 46 spaced from and closely adjacent the outer edge 47 of the metering ring 43 and is clamped in position between the upper side of the outer bearing race 40 and a shoulder 48 formed on the bearing housing flange 38. Thus, lubricant is fed to the bearings 39 through an annular restricted lubricant metering passage formed between the metering rings 43 and 45 and passes through the bearings 39 to a collecting chamber 50. A grease lubricant fitting 51 is secured to a supply opening 52 formed in the side wall 38 of the lubricant reservoir and a vent opening 53 is formed in this side wall on the side opposite the supply opening 52 and is closed by a screw plug 54. When lubricant is supplied to the lubricant reservoir 43 through the grease fitting 51, the screw plug 54 is removed, so that when the reservoir is full of lubricant some of the lubricating grease will pass through the vent 53 and give an indication of this condition to the attendant, so as to prevent forcing grease through the restricted passage and into the space between the bearings 39. A drain 55 is formed in the lower portion of the collecting chamber 50 and a drain plug 56 is adapted to close this drain during normal operation and to be removed in order to drain out excess lubricant from the collecting chamber 50.

Figure 3:
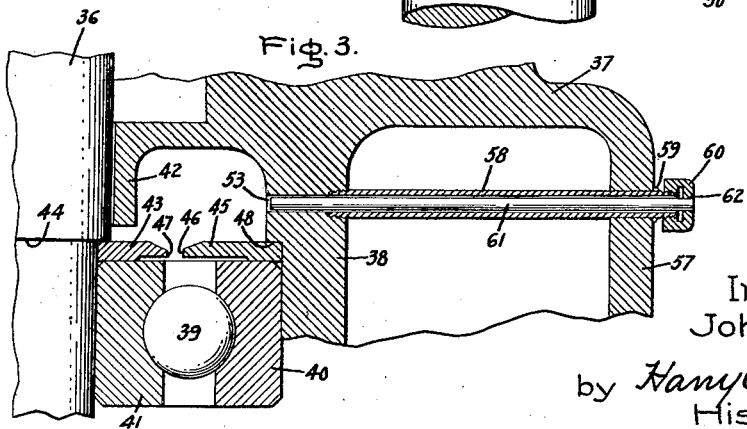

Fig. 3 illustrates a modification of the construction shown in Fig. 2, wherein the supporting frame 37 is formed with an outer wall 57 which extends downwardly over the bearing housing 38, making it difficult and undesirable to provide a vent plug as shown in Fig. 2. In order to overcome this difficulty and provide a satisfactory indicating arrangement, a vent tube 58 is secured by threaded engagement into the vent 53 and is welded at 59 to the outer wall 57. In order to exclude foreign substances from the lubricant reservoir, a vent tube cover 60 is adapted to close the outer end of the vent tube 58 and is secured thereto by threaded engagement therewith. With such a construction, it has been found that the lubricating grease will tend to harden in the vent tube 58 so that when the reservoir 43 is being replenished, grease will not pass through the vent 53 and the vent tube 58, and will fail to give an indication to the attendant that the reservoir has been filled, resulting in the forcing of grease into the space between the bearings 39. This undesirable feature is prevented by providing the vent tube cover 60 with a rod element 61 welded at 62 to the vent tube cover 60 and constructed substantially to fill the vent tube 58 and the vent 53 when the cover 60 is in position over the outer end of the vent tube. With this construction, the vent tube cover 60 is removed whenever lubricating grease is supplied to the reservoir 43, and the rod 61 which is rigidly secured to the cap 60 also is removed from the interior of the vent and vent tube leaving a clean passage through which the lubricating grease may pass when the reservoir is full to give an indication of this condition to the attendant, thereby insuring against the forcing of grease into the bearings when replenishing the lubricant reservoir.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A supporting structure for a rotatable shaft including a bearing housing having a lubricant reservoir, anti-friction bearings mounted in said bearing housing, an annular element mounted on said shaft adjacent said bearing, and a second annular element mounted on said bearing housing adjacent said bearing with the inner edge thereof closely adjacent the outer edge of said shaft mounted annular element providing a restricted passage for lubricant from said reservoir to said bearing.

2. A supporting structure for a rotatable shaft including a bearing housing having a lubricant reservoir, a bearing mounted in said bearing housing, an annular element mounted on said shaft adjacent said bearing, a second annular element mounted on said bearing housing adjacent said bearing with the inner edge thereof spaced from and closely adjacent the outer edge of said shaft mounted annular element providing an annular restricted passage for lubricant from said reservoir to said bearing, and means for collecting lubricant which has passed through said bearing.

3. A supporting structure for a rotatable shaft including a bearing housing having a lubricant reservoir, a bearing mounted in said bearing housing, a ring mounted on said shaft adjacent said bearing, a second ring mounted on said bearing housing adjacent said bearing with the inner edge thereof closely adjacent the outer edge of said shaft mounted ring providing an annular restricted passage for lubricant from said reservoir to said bearing, means for supplying lubricant to said reservoir, and a vent in said lubricant reservoir for indicating when said lubricant reservoir is substantially filled with lubricant.

4. A supporting structure for a rotatable shaft including a bearing housing having a lubricant reservoir, anti-friction bearings mounted in said bearing housing, a ring mounted on said shaft adjacent said bearing, a second ring mounted on said bearing housing adjacent said bearing with the inner edge thereof closely adjacent the outer edge of said shaft mounted ring providing an annular restricted passage for lubricant from said reservoir to said bearing, means for supplying lubricant to said reservoir, a vent in said lubricant reservoir for indicating when said lubricant reservoir is substantially filled with lubricant, and means including an element for substantially filling said vent and closing the outer end thereof.

5. A supporting structure for a rotatable shaft including a bearing housing having a lubricant reservoir portion and a bearing mounting portion, anti-friction bearings having an inner race and an outer race mounted on said shaft and on said bearing housing, a ring mounted on said shaft between said inner bearing race and said lubricant reservoir, a second ring mounted on said bearing housing between said outer bearing race and said lubricant reservoir with the inner edge thereof closely adjacent the outer edge of said shaft mounted ring providing an annular restricted passage for lubricant from said reservoir to said bearing, means for supplying lubricant to said reservoir, and a vent in said lubricant reservoir for indicating when said lubricant reservoir is substantially filled with lubricant.

6. A supporting structure for a rotatable shaft including a bearing housing having a lubricant reservoir, anti-friction bearings mounted in said bearing housing, an annular element mounted on said shaft adjacent said bearing, a second annular element mounted on said bearing housing adjacent said bearing with the inner edge thereof closely adjacent the outer edge of said shaft mounted annular element providing a restricted passage for lubricant from said reservoir to said bearing, means for supplying lubricant to said reservoir, a vent in said lubricant reservoir for indicating when said lubricant reservoir is substantially filled with lubricant, a vent tube secured to said bearing housing and extending from said vent, and a vent tube cover having an element thereof adapted substantially to fill said vent tube and said vent when said cover is in position on the outer end of said vent tube.

7. A supporting structure for a rotatable shaft including a bearing housing having a lubricant reservoir portion and a bearing mounting portion, anti-friction bearings having an inner race and an outer race mounted on said shaft and on said bearing housing respectively, a ring mounted on said shaft between said inner bearing race and said lubricant reservoir, a second ring mounted on said bearing housing between said outer bearing race and said lubricant reservoir with the inner edge thereof closely adjacent the outer edge of said shaft mounted ring providing a restricted passage for lubricant from said reservoir to said bearing, means for supplying lubricant to said reservoir, a vent in said lubricant reservoir for indicating when said lubricant reservoir is substantially filled with lubricant, and means including an element for substantially filling said vent and closing the outer end thereof.

JOHN W. TEKER.